Aug. 10, 1937.  P. T. SPRAGUE ET AL  2,089,862
RESTRICTED RANGE DIFFERENTIAL PRESSURE GAUGE
Filed Feb. 19, 1934  2 Sheets-Sheet 1

INVENTORS.
Philip T. Sprague.
Arnold Soller.
BY
ATTORNEY.

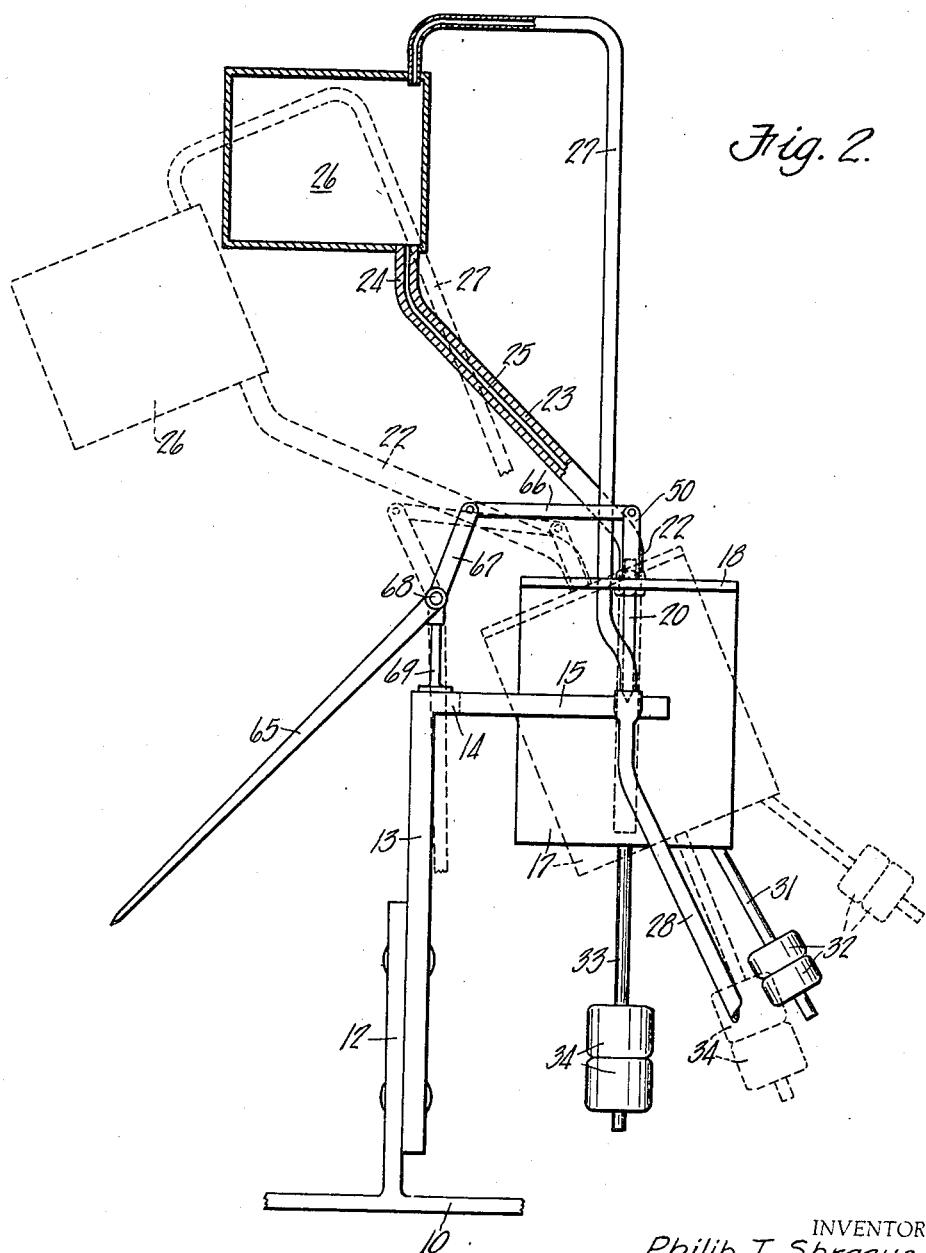

Patented Aug. 10, 1937

2,089,862

UNITED STATES PATENT OFFICE 2,089,862

RESTRICTED RANGE DIFFERENTIAL PRESSURE GAUGE

Philip T. Sprague and Arnold Soller, Michigan City, Ind., assignors to The Hays Corporation, Michigan City, Ind.

Application February 19, 1934, Serial No. 711,983

16 Claims. (Cl. 73—31)

The invention relates to differential pressure gauges, and particularly to gauges of this character which are actuable only within a predetermined restricted range of applied pressure.

Differential pressure gauges as heretofore constructed have generally been actuable or operable by any variation from a predetermined relation of two applied pressures. In many instances, however, certain of the variations from a given relation of such pressures are not considered of importance; while great importance is placed upon variations which occur within a definite restricted range or between definite limits, within which range or limits a high degree of sensitivity of the instrument is desired. It is therefore the primary object of the invention to provide a device of this character which is operable only in a restricted range of differential pressure, and which is very sensitive within said range.

A further object is to provide a device of this character having pivotally mounted high and low pressure chambers disposed in angularly vertically spaced relation and provided with a counterweight normally balancing said chambers in neutral position.

A further object is to provide a device of this character having a pivotally mounted, liquid containing high pressure chamber which supports, and has connection through a restricted opening with, a vertically and laterally spaced lower pressure chamber, said high pressure chamber carrying a counterweight which maintains said device in balanced position until the liquid in said high pressure chamber has been forced, by the reaching of a predetermined differential pressure, into the lower pressure chamber where its weight pivots said high pressure chamber.

A further object is to provide a counterbalanced pivotal device of this character with a weight serving to calibrate and limit the pivotal movement of the device.

A further object is to provide a counterbalanced pivotal device of this character with a small bore tube for a liquid responsive to differential of pressure, whereby a rise of said liquid in said tube is inoperative to pivot said device.

A further object is to provide a counterbalanced pivotal device of this character operable by movement of a pressure governed liquid to a position to destroy the balance of the device, with means for counteracting said unbalancing movement to restrict the range of pivotal movement of the device induced thereby.

With the above and other objects in view, the invention resides in the combination and arrangement of parts as hereinafter set forth, shown in the drawings, described and claimed, it being understood that changes in the precise embodiment of the invention may be made within the scope of what is claimed without departing from the spirit of the invention.

In the drawings:

Figure 2 is a view of the device supplied with an indicating pointer in front elevation, with parts shown in section.

Figure 1:
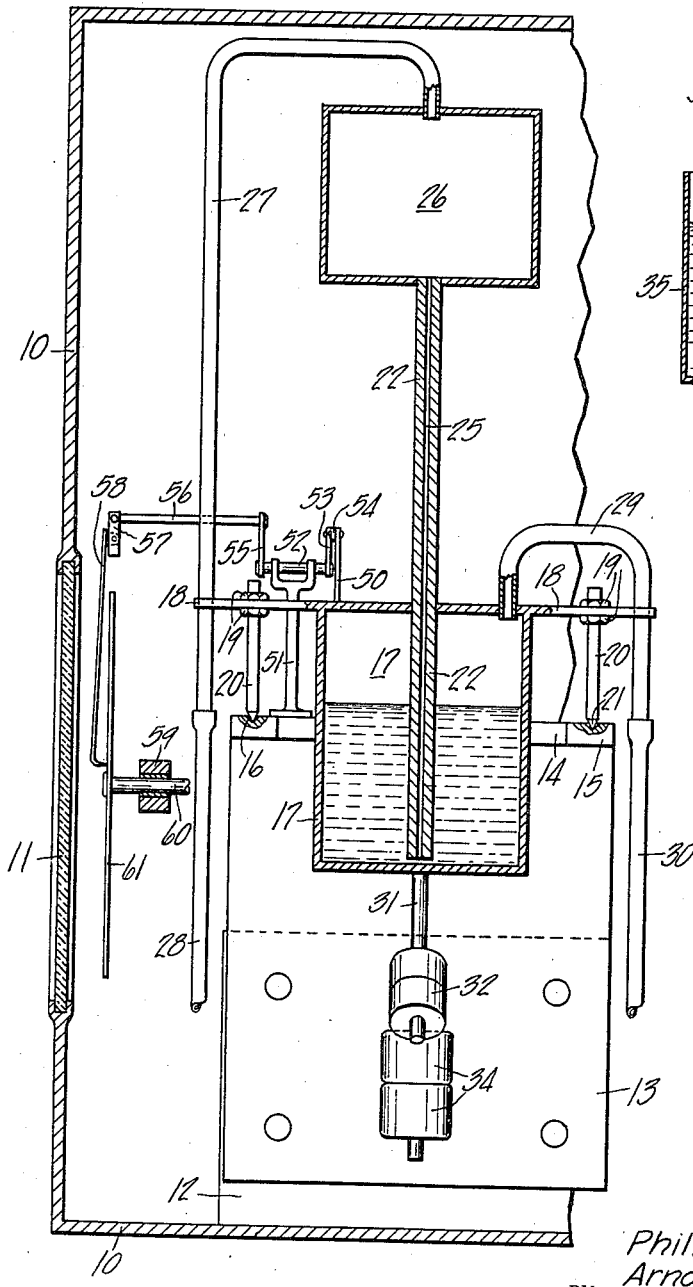
Figure 1 is a side view of a device of this character supplied with a recorder, and illustrating a casing therefor in fragmentary section and with parts thereof shown in section.

Referring to the drawings, which illustrate the preferred embodiment of the invention, the numeral 10 designates a casing having a sight opening 11 and a supporting member 12. On supporting member 12 is fixedly mounted the vertical flange 13 of an angle frame which includes a horizontal bifurcated plate 14 whose fork arms 15 are each provided with a depression 16 formed centrally and intermediate the length thereof, for purposes to be hereinafter set forth.

Positioned between and in spaced relation to fork arms 15 of said frame is a container 17 for a suitable liquid, such as mercury, and said container carries flanges 18 projecting laterally therefrom at the top thereof. To each of these flanges 18 is fixedly secured, as by means of nuts 19 threaded thereon, a rod 20 extending downwardly therefrom, each of said rods 20 being provided with a tapered or pointed lower end 21 which is adapted to seat in a depression 16 formed in the frame. These rods thus support the container 17 on the frame for pivotal movement relative to said frame.

A conduit 22 is fixedly carried by the top of container 17 at the center thereof and extends into said container in closely spaced relation to the bottom thereof. In spaced relation to the top of the container 17, conduit 22 is bent to provide a portion 23 thereof extending angularly upwardly, and adjacent its upper end conduit 22 is provided with a vertical portion 24. The entire conduit 22, as thus formed, lies in a plane perpendicular to and bisecting a line projected between the tapered ends 21 of rods 20. The bore 25 of conduit 22 is very small and but little larger than a capillary tube. At its upper end, conduit 22 fixedly carries a second container 26 to position the same in angularly vertically spaced relation to container 17. Conduit 22 terminates at its upper end flush with the inner face of the bottom wall of container 26 at a point adjacent one of the side walls of said container, and the major portion of said container extends from said conduit 22 in a direction opposite to or outwardly from a vertical projection of the pivot axis of the device.

A rigid conduit 27 communicates with and is carried by container 26 at a point above conduit 22, and extends downwardly therefrom and passes through a suitable opening in one of the flanges 18 carried by container 17 in laterally outwardly spaced relation to angle frame 14, whereby said flange serves to fixedly position it relative to containers 17 and 26. Conduit 27 terminates at its lower end in substantial alignment with the pivot axis of the container 17, at which point it is connected with a suitable flexible conduit 28. A rigid conduit 29 is carried by the upper end of container 17 and extends therefrom to and through a suitable opening in the opposite flange 18 of said container in laterally spaced relation to angle frame 14 to be fixedly positioned relative to said container 17. Conduit 29 also terminates in alignment with the pivot axis of the container 17 and has connection with a suitable flexible conduit 30.

Fixedly carried by the bottom wall of container 17 is a rod 31 which extends angularly downwardly therefrom and from the pivot axis of said container in a direction opposite that of container 26 relative to said pivot axis. At its lower end rod 31 carries weights 32, which may be adjusted thereon, as by screw threaded mounting thereof on said rod.

A second rod 33 is fixedly carried by container 17, and extends vertically downwardly from the center thereof whereby an upward projection thereof would intersect the pivot axis of said container. Weights 34 are supported by rod 33 by means of an adjustable screw threaded engagement therewith.

Figure 3:
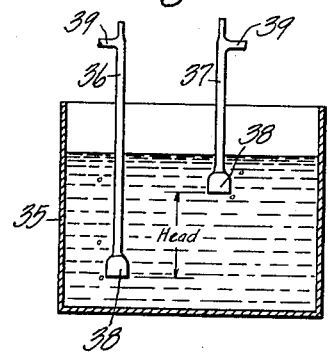
Figure 3 is a sectional view illustrating one form of differential pressure connection by which the device is actuable.

The device is adapted for connection with sources of differential pressure by means of conduits 28 and 30. One form of this connection is illustrated in Figure 3, wherein a container or tank 35 contains a liquid, the changes of specific gravity of which within a predetermined range are desired to be indicated or recorded or utilized for controlling purposes, as in the manufacture of chemicals whose required specific gravity is desired to be precisely obtained by halting the manufacturing process as soon as the required specific gravity is reached. The device is connected to such a container by means of tubes 36 and 37, each carrying a bell at its lower end, the tube 36 being immersed in the liquid to a greater depth than tube 37, the difference in depth providing a head of differential pressure when air is supplied to the tubes through branch pipes 39 thereof with sufficient pressure to force bubbles through the liquid, in the manner well understood in the art. Flexible conduit 30 is connected with tube 36, and conduit 28 is connected with tube 37. In this type of installation, the tubes 36 and 37 are preferably so positioned in tank 35 that the head of differential pressure is equal to the pressure at which operation of the gauge is to begin, and is also the same as the pressure head between the level of the liquid in container 17 and the level of the inner face of bottom wall of container 26. It will be understood, of course, that mercury may be used in container 17, whereby the pressure head thereof will be measurable in inches of mercury, while the pressure head of container 35 may be measurable in inches of water.

In the installation above described, any change in the specific gravity of the liquid in container 35 within a range below that at which recording or indicating is desired to begin, acts merely to vary the height of the mercury in conduit 22 of the instrument. Variations in height of the mercury within the conduit 22 are not sufficient or operative to pivot the device against the action of counterweight 32 because of the small size of the bore 25 thereof which limits the weight of the mercury in said conduit to minute proportions. When the specific gravity of the given liquid reaches and slightly exceeds the minimum of the range which the instrument is to record or indicate or by which it is desired that the instrument be actuated, the variation of pressure resulting therefrom will force the mercury from container 17 through conduit 22 and into container 26. The mercury, in seeking its level in container 26 flows from tube 22 in a direction laterally and outwardly of the pivot axis of the device, and thus alters the normal balanced relation of the weight of container 26 and conduit 22 to counterweight 32 in a manner to tilt or pivot the device. The normal action, upon destruction of this balanced relation would be that each minute tilting movement, however small, would shift the center of gravity of the pivot axis to produce a further pivoting, the liquid, in other words, becoming a variable and cumulative tilting member, whereby the pivoting would continue until the relative position of container 26 and counterweight 32 would be substantially horizontal. It will be seen that such an action is prevented in the instant device by the weight 34 which restrains pivotal movement of the device in proportion to the amount of mercury forced into said container by the differential pressure intended to govern the action of the device. By this action the weight 34 also serves to calibrate the pivotal movement of the device. The action of the device is therefore positively controlled by the differential of pressures applied thereto, and the movement of the container 26 is restrained within narrow limits to facilitate the use of a casing 10 of minimum size. It will also be seen that the connection of flexible tubes 28 and 30 with rigid tubes 27 and 29, respectively, at points aligned with the pivot axis of container 17, i. e. with a line projecting between ends 21 of rods 20, permits the pressure supplying tubes to flex about said pivot axis, and thus eliminates all possibility of such tubes, by the weight thereof, effecting the action of the device in its pivotal movement to vary the movement thereof from that caused by the application of pressures per se.

Figure 4:
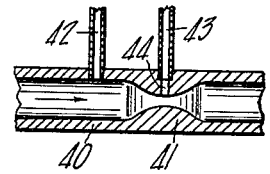
Figure 4 is a sectional view illustrating another form of differential pressure connection by which the device is actuable.

In Figure 4 is illustrated another source of differential pressure with which the device may be connected, and which comprises a Venturi tube 40 having a restricted bore diameter or Venturi portion 41. A tube 42 is carried by and communicates with the bore of said tube 40 on the feed side of Venturi portion 41, and a second tube 43 is carried by tube 40 and communicates with a bore 44 formed in Venturi portion 41. Flexible conduit 30 is connected to tube 42, and conduit 28 is connected to tube 43 to apply to the chambers 17 and 26, respectively, the pressures at such points of tube 40. This type of installation produces actuation of the device through variations, within any desired range, of the difference in pressure of flow through the tube 40 at different points thereof, whether the fluid be a gas or a liquid.

The device may be applied and used in a number of ways, that illustrated in Figure 1 being to record the variations of differential pressure applied to the instrument. For this purpose an arm 50 is carried by the chamber 17, preferably projecting vertically upwardly therefrom, by which the recorder is actuated. A suitable standard or bearing 51 is carried by frame 14 and journals a horizontal shaft 52. A vertical arm 53 is fixedly carried at one end of shaft 52, and this arm 53 is connected to arm 50 by a suitable link 54. At its opposite end the shaft 52 carries another arm 55 which mounts a horizontal rod 56 extending adjacent the front wall of casing 10 and carrying, at its outer end, a pivotal mounting member 57 for a recording stylus 58 which depends therefrom to a position behind said casing sight opening 11. A suitable journal support 59 is carried by casing 10 to journal a horizontal shaft 60 which may be connected with any suitable drive means (not shown). A dial 61 is carried by said shaft and positioned behind said casing sight opening to be engaged by said stylus.

In Figure 2 the device is illustrative as operative to control an indicating pointer 65. This pointer has operative connection with the arm 50 of the instrument through a pivoted link 66 connected to the end of arm 50, which link 66 is pivotally connected with an arm 67 fixedly carried by the shaft 68 which mounts the pointer. Shaft 68 is journaled in a suitable frame or bearing 69 which is carried by frame 14.

These two applications of the instrument are merely illustrative, and it is obvious that the pivotal movement of the device may be utilized in various ways and for various purposes, and that the arm 50 or other suitable member or means carried by the instrument may be operatively associated with an electric circuit to open and close the same, with a valve through operative connecting means similar to that illustrated, and the like. These various hook-ups or arrangements are all preferably made, as in the manner illustrated, whereby a comparatively small movement of the instrument and of arm 50 may be amplified to the extent required, as to provide a long swinging movement of stylus 58.

It will thus be seen that the device is constructed to be inoperable by changes in differential pressure of connected pressure sources when such changes are without a predetermined restricted pressure range, but is highly sensitive to pressure changes within said predetermined range; that the variable element incident to shifting of the center of gravity of a body of liquid in a pivoting member is compensated for; that the operation of the device is calibrated and its pivotal movement is restricted within narrow limits; and that variations of pivotal position can result only from variations of pressure supplied thereto.

The invention having been set forth, what is claimed as new and useful is:—

1. In a differential pressure actuated device, a frame, a chamber pivotally supported by said frame, a conduit extending angularly upwardly from said chamber, said conduit having a small bore, a second chamber carried by said conduit, means connecting said first chamber with a source of high pressure, means connecting said second chamber with a source of low pressure, said connecting means being flexible at a point aligned with the pivot axis of said first chamber, a counterbalance carried by said first chamber in angularly downwardly disposed relation thereto, and a vertically depending weight carried by said first chamber, said first chamber containing a liquid which may be forced through said conduit and into said second chamber by the pressures applied to pivot said first chamber, liquid in said conduit at a level below said second chamber being inoperative to pivot said chamber.

2. In a differential pressure actuated device, a frame, a liquid containing chamber pivotally supported by said frame, a small bore conduit extending angularly upwardly from said chamber, means connecting said chamber with a source of high pressure, a second chamber carried by and communicating with said conduit, means connecting said second chamber with a source of low pressure, a counterbalance carried by said first chamber in angularly downwardly disposed relation thereto, and a vertically depending weight carried by said first chamber, the liquid of said first chamber being forced through said conduit by the applied pressures, application of pressures within a predetermined range forcing said liquid into said second chamber to pivot the device against the action of said counterbalance and weight.

3. In a differential pressure actuated device, a pivotally mounted liquid containing chamber, a second chamber carried by said first chamber in angularly upwardly directed relation thereto, a conduit connecting said chambers, means for connecting said first chamber with a source of high pressure, means for connecting said second chamber with a source of low pressure, a counterbalance for said second chamber carried by said first chamber, and a calibrating weight carried by said first chamber, shifting of said liquid to said second chamber by applied pressure pivoting said chambers, said calibrating weight serving to restrain said pivotal movement.

4. In a differential pressure actuated device, a pivotally mounted liquid container, a chamber carried by said container in laterally spaced relation thereto, a conduit connecting said container and chamber, means for connecting said chamber and container with sources of pressure, and a counterbalance of said chamber carried by said container, said conduit having a small bore whereby liquid forced therein by the applied pressure is inoperable to overcome said counterbalance, said container being pivoted by the weight of liquid forced into said chamber.

5. In a differential pressure actuated device, a pivotally mounted liquid container, a chamber carried by said container in laterally and vertically spaced relation thereto and having communication therewith through a small passage, a counterbalance for said chamber carried by said container, a vertically depending calibrating weight carried by said container, and means connecting said container and chamber with sources of pressure.

6. In a differential pressure actuated device, a pivotally mounted liquid container, a chamber carried by the upper side of said container in laterally off-set relation thereto, a small bore conduit connecting said container and chamber, pressure connections for said container and said chamber, means carried by said container for normally balancing the weight of said chamber, and means carried by said container for calibrating and restricting the pivotal movement produced by pressure controlled shifting of said liquid to said chamber.

7. In a differential pressure actuated device, a pivotally mounted high pressure connected liquid container, a low pressure connected chamber carried by said container in laterally and vertically off-set relation thereto, means connecting said container and chamber for conducting liquid therebetween upon application of pressure to said liquid, means for normally balancing said container, and means for calibrating and restricting pivotal movement of said container produced by the weight of liquid forced into said chamber.

8. In a differential pressure actuated device, a pivotally mounted high pressure connected liquid container, a low pressure connected chamber carried by said container in laterally and vertically off-set relation thereto, means connecting said chamber and container for conducting liquid therebetween upon application of pressure to said liquid, and means for normally balancing said container and restricting pivotal movement thereof produced by the weight of liquid forced into said container.

9. In a differential pressure actuated device, a normally balanced pivotally mounted liquid container, a low pressure chamber carried by said container in off-set relation thereto and having a liquid conducting passage connection therewith, and means for connecting said container and chamber with sources of differential pressure, said connecting means being flexible at points thereof aligned with the axis of pivot of said container.

10. In a differential pressure actuated device, a normally balanced pivotally mounted liquid container, a chamber carried by said container in angularly disposed relation to the pivot axis of said container, means for connecting said container and chamber with sources of pressure, and a conduit for conducting liquid under pressure from said container to said chamber to pivot said container, said conduit having a small bore whereby liquid forced therein to a level below said chamber is inoperative to pivot said container.

11. In a differential pressure actuated device, a pivotally mounted liquid container, said container having connection with a source of pressure, a chamber carried by and communicating with said container, said chamber having connection with a source of pressure, variations in pressure applied to said chamber and container forcing liquid into said chamber to pivot said container, means for restricting pivotal movement of said container, and means for transmitting the pivotal movement of said container including movement amplifying mechanism.

12. In a differential pressure actuated device, a liquid container mounted for limited pivotal movement relative to a support, means for applying pressure to said container, a chamber carried by and communicating with said container, means for applying pressure to said chamber, variations in pressure forcing liquid into said chamber to pivot said container, and means for transmitting the movement of said container including a member carried by said container, and amplifying mechanism actuated by said member.

13. In a differential pressure actuated device, a liquid container mounted for limited pivotal movement relative to a support, means for applying pressure to said container, a chamber carried by and communicating with said container, means for applying pressure to said chamber, variations in pressure forcing liquid into said chamber to pivot said container, and movement amplifying mechanism actuated by said container.

14. In a differential pressure actuated device, a pivotal liquid container, a chamber carrier by and communicating with said container, a high pressure connection for said container, a low pressure connection for said chamber, and means for balancing said container until liquid has been forced into said chamber from said container by pressure.

15. In a differential pressure actuated device, a normally balanced pivotal unit comprising a pair of laterally and vertically off-set chambers, means positioned below said upper chamber for pivoting said unit, the lower chamber containing liquid and being connected to a a source of high pressure, the upper chamber being connected to a source of lower pressure and having its bottom spaced above the top of the lower chamber, a small bore tube connecting said chambers, and means for balancing said unit until liquid is forced into said upper chamber by at least a predetermined differential between the pressures applied.

16. In a differential pressure actuated device, a unit comprising a liquid container and a chamber normally positioned in spaced offset relation above the liquid level of said container and communicating therewith, said spaced relation being such that a substantial pressure difference must exist between the container and chamber before liquid enters said chamber, means positioned below and to one side of said chamber for pivotally mounting said unit, a high pressure connection for said container, a low pressure connection for said chamber, and means for balancing said unit until liquid has been forced into said chamber from said container by pressure.

PHILIP T. SPRAGUE.
ARNOLD SOLLER.